No. 733,535. PATENTED JULY 14, 1903.
W. W. BENSON.
COUPLING FOR PIPES OR CONDUITS.
APPLICATION FILED FEB. 27, 1903.
NO MODEL. 3 SHEETS—SHEET 1.

WITNESSES: INVENTOR
Wm. W. Benson
BY
Chas. N. Butler
ATTORNEY.

No. 733,535. PATENTED JULY 14, 1903.
W. W. BENSON.
COUPLING FOR PIPES OR CONDUITS.
APPLICATION FILED FEB. 27, 1903.
NO MODEL. 3 SHEETS—SHEET 2.

WITNESSES:

INVENTOR
Wm. W. Benson
BY
Charles N. Butler
ATTORNEY.

No. 733,535. PATENTED JULY 14, 1903.
W. W. BENSON.
COUPLING FOR PIPES OR CONDUITS.
APPLICATION FILED FEB. 27, 1903.

NO MODEL. 3 SHEETS—SHEET 3.

WITNESSES:
Harry E. Kelly
Utley E. Crane Jr

INVENTOR
Wm. W. Benson
BY
Chas. N. Butler
ATTORNEY.

No. 733,535. Patented July 14, 1903.

UNITED STATES PATENT OFFICE.

WILLIAM W. BENSON, OF PHILADELPHIA, PENNSYLVANIA.

COUPLING FOR PIPES OR CONDUITS.

SPECIFICATION forming part of Letters Patent No. 733,535, dated July 14, 1903.

Application filed February 27, 1903. Serial No. 145,378. (No model.)

*To all whom it may concern:*

Be it known that I, WILLIAM W. BENSON, residing at Philadelphia, in the county of Philadelphia and State of Pennsylvania, have invented certain new and useful Improvements in Couplings for Pipes or Conduits, of which the following is a specification.

This invention relates to couplings for pipes and conduits generally, but particularly such as are employed for holding electric conductors; and its chief purpose is to form a strong and tight joint in a simple manner.

The nature and characteristic features of the improvements will more fully appear by reference to the following description and the accompanying drawings in illustration thereof, of which—

Figure 1:
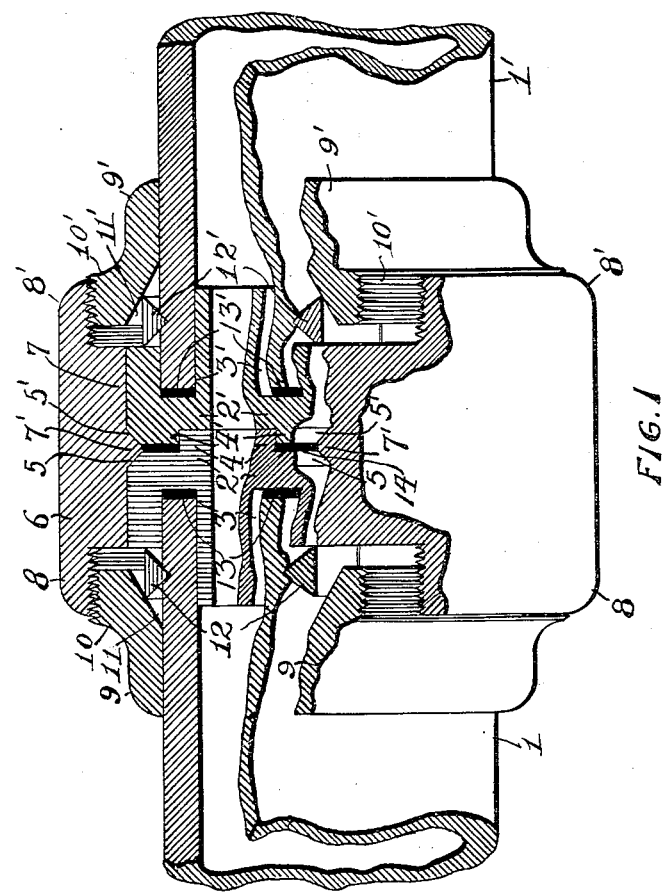
Figure 2:
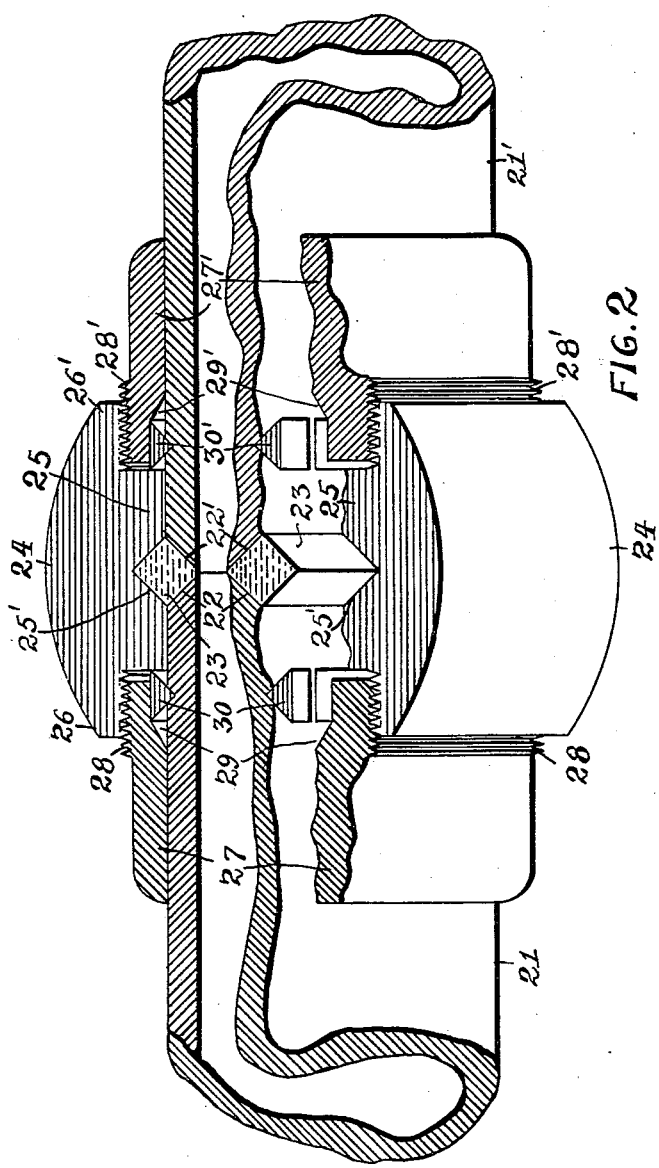

Figure 1 represents a side elevation, partially in section, in illustration of one form of my invention. Fig. 2 represents a side elevation, partially in section, showing a second form of my invention; and Fig. 3 represents a side elevation, partially in section, showing a third form of my invention.

Referring to the drawings, as shown in Fig. 1, the pipes 1 and 1' are held in alinement by the sectional collar or thimbles 2 and 2'. These thimbles are provided with the respective channels or recesses 3 and 3', which receive the ends of the corresponding pipes, and with the flanges 4 and 4', which engage in telescoping relation, the adjacent ends of the thimbles being provided with the beveled peripheral surfaces 5 and 5'. A union 6, within which the thimbles fit, has an internal collar 7 in contact with the thimbles and an internal V-shaped flange 7', which lies between the surfaces 5 and 5', to control the union and to close the joint between the thimbles, the union being also provided with the screw-threaded flanges 8 and 8'. Clamping-rings 9 and 9', sleeved on the respective pipes, have the screw-threaded flanges 10 and 10', which engage the respective flanges 8 and 8', the rings being also provided with the conical seats 11 and 11'. Split rings 12 and 12', preferably of triangular section and having conical faces intersecting to form an internal angle, are sleeved on the respective pipe ends and engaged by the respective seats 11 and 11'. The joints 13, 13', and 14 may be packed with rubber or other suitable material. The parts being assembled in the relation described, the rings 9 and 9' are simultaneously turned in opposite directions and drawn together, thus closing the split rings 12 and 12' upon the respective pipe-sections, the conical seats 11 and 11' pressing in the edges of the split rings engaged therewith and throwing forward the internal edges, so that biting and thrusting actions are exerted thereby. The sections 1 and 1' are thus drawn together and the impact of the rings 12 and 12' upon the thimbles 2 and 2' force the latter together, thus tightly closing the joint.

Figure 3:
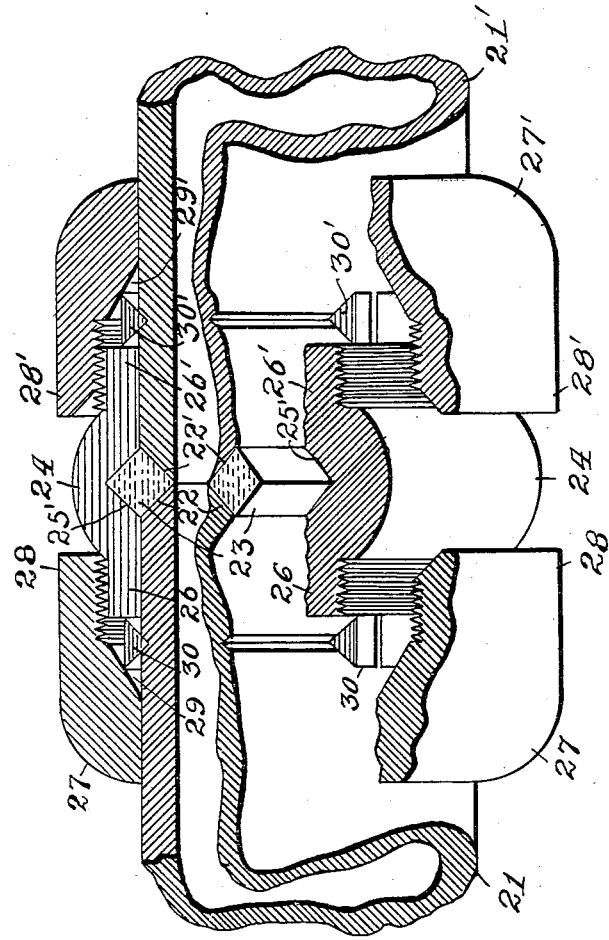

As shown in Figs. 2 and 3, the pipes 21 and 21' have their respective ends beveled to provide the seats 22 and 22' for the reception of the packing and alining ring or collar 23, suitably of rectangular section and of comparatively soft material. A union 24, having the internal bearing surface or collar 25 in engagement with the ends of the respective pipes 21 and 21' and the internal groove 25' in engagement with the ring 23, has the screw-threaded flanges 26 and 26', which engage with the clamping-rings or sleeves 27 and 27' through the screw-threaded flanges 28 and 28' thereon, these flanges being provided with the seats 29 and 29'. Split rings 30 and 30', having a broad periphery and angular interior faces, forming an internal biting edge, are sleeved on the respective pipe ends between the union and clamping-rings, being engaged by the seats of the latter. The parts being assembled as set forth, the clamping-rings are turned in opposite directions and drawn together, the split rings are contracted or closed upon the pipes and bite into them, and the parts are drawn closely together.

Having described my invention, I claim—

1. In a coupling, mechanism for engaging adjacent ends of and alining sections of a pipe, a union connected with said mechanism and held thereby against movement along said pipe, a sleeve or clamping-ring engaged by said union, and a split ring engaged by said clamping-ring and adapted to engage said pipe, substantially as specified.

2. In a coupling, a collar comprising a pair of engaging rings respectively adapted for engaging adjacent ends of alined pipe-sections, a union on said rings, sleeves engaged by said union and adapted to be drawn together thereby, and open rings adapted to be engaged and compressed by said sleeves, substantially as specified.

3. In a coupling, a collar comprising a pair of rings having engaging members for holding them in concentric relation, each of said rings having means for engaging a pipe end, a union having means for engaging the joint between said rings, sleeves engaged by said union and adapted to be drawn together thereby, and split rings adapted to be engaged by said sleeves, substantially as specified.

In testimony whereof I have hereunto set my hand, this 25th day of February, A. D. 1903, in the presence of the subscribing witnesses.

WM. W. BENSON.

Witnesses:
C. W. DUNLAP,
UTLEY E. CRANE, Jr.